United States Patent [19]

Mori et al.

[11] 4,262,243

[45] Apr. 14, 1981

[54] GENERATOR OPERATION INDICATING APPARATUS FOR VEHICLE GENERATORS HAVING A PROTECTIVE CIRCUIT AGAINST ABNORMAL VOLTAGE

[75] Inventors: Kazumasa Mori, Aichi; Taro Asahi, Chiryu; Keiichiro Banzai, Toyota; Katsutaro Iwaki, Chiryu; Katsuya Muto, Kariya; Akira Mase, Handa; Takayasu Nimura, Nagoya; Katsumi Itoh, Oobu; Yoshio Akita, Ichinomiya, all of Japan

[73] Assignee: Nippondenso Co., Ltd., Kariya, Japan

[21] Appl. No.: 55,366

[22] Filed: Jul. 6, 1979

[30] Foreign Application Priority Data

Aug. 3, 1978 [JP] Japan ................................ 53-94892

[51] Int. Cl.³ .............................................. H02J 7/00
[52] U.S. Cl. ......................................... 322/99; 361/21
[58] Field of Search ...................... 361/21, 91; 322/28, 322/99; 320/48; 340/635, 662

[56] References Cited

U.S. PATENT DOCUMENTS

| | | | |
|---|---|---|---|
| 3,612,978 | 10/1971 | Mori | 322/99 X |
| 3,764,879 | 10/1973 | Hill | 322/99 X |
| 4,023,089 | 5/1977 | Arakane | 322/99 X |

Primary Examiner—Harry E. Moose, Jr.
Attorney, Agent, or Firm—Cushman, Darby & Cushman

[57] ABSTRACT

A generator operation indicating apparatus for vehicle generators having a protective circuit against abnormal voltage, includes a drive circuit for turning an indicating device on from the time of closing of a key switch until the time that a vehicle generator attains a predetermined operating condition to indicate the generator operation and a control circuit for forcibly rendering the drive circuit inoperative in response to the occurrence of an abnormal voltage between the indicating device and the drive circuit. When the generator attains the predetermined operating condition, the indicating device is turned off and the supply of current to a load circuit is started. In this case, the drive circuit is also forced to come out of operation upon occurrance of an abnormal supply voltage.

5 Claims, 3 Drawing Figures

GENERATOR OPERATION INDICATING APPARATUS FOR VEHICLE GENERATORS HAVING A PROTECTIVE CIRCUIT AGAINST ABNORMAL VOLTAGE

BACKGROUND OF THE INVENTION

1. Field of the Invention

The present invention relates to generator operation indicating apparatus for vehicle generators, and more particularly the invention relates to a generator operation indicating apparatus which is capable of giving a satisfactory indication of generator operation and also serving a function of stopping the indication and protecting the circuit elements upon application of an abnormal voltage to the terminal L side of the apparatus during the indicating operation.

2. Description of the Prior Art

Transistorized generator operation indicating apparatuses are known in the art and they are generally so constructed that an indication of generator operation is given by operating an indicator lamp during the time interval between the time that the key switch is closed and the time that the generated voltage of the generator attains a predetermined value. When the power supply voltage is applied to the indicator lamp driving terminal L due to a malfunction, such as short-circuiting or contact failure of the indicator lamp, there is the danger of damaging the transistors in the generator operation indicating circuit.

Summary of the Invention

The present invention has been made in view of these circumstances and it is the object of the invention to provide a generator operation indicating apparatus for vehicle generators which is designed so that usually satisfactory indication of generator operation is ensured and in the event that an abnormal voltage is applied to the terminal L by some reason or other during the indicating operation, the indicating operation is rapidly stopped forcibly to prevent the circuit elements from being broken.

DESCRIPTION OF THE PREFERRED EMBODIMENTS

Figure 1:
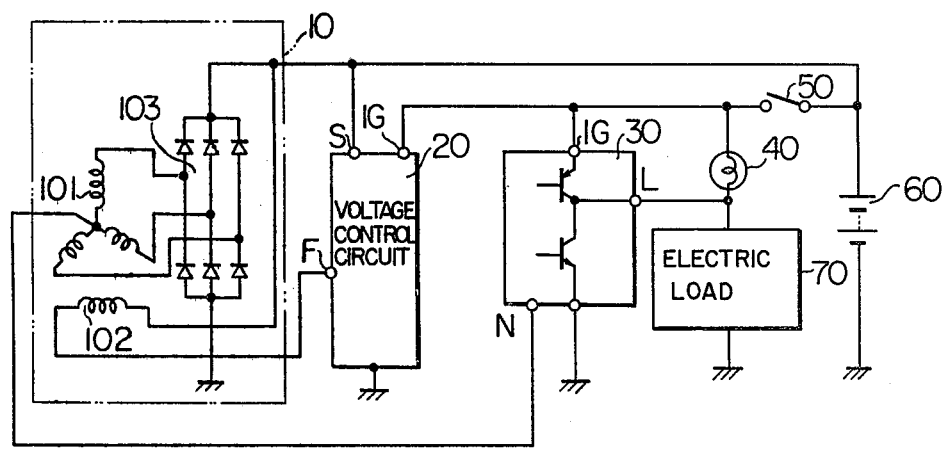
FIG. 1 is a circuit diagram showing the overall construction of an embodiment of the present invention.

Referring first to FIG. 1 showing an overall circuit diagram for an embodiment of the invention which is adapted for use with automobile generators, numeral 10 designates an alternating current generator comprising armature coils 101, a field coil 102 and a rectifier for full-wave rectification, whereby the rotor having the field coil 102 is rotated by the engine of an automobile and the resulting three-phase AC voltage is full-wave rectified, thus generating a DC output. Numeral 20 designates a known type of voltage control circuit responsive to the closing of a key switch 50 to apply an initial excitation to the generator 10 and moreover when the engine is started so that the generated voltage of the generator 10 increases, depending on whether the generated voltage or the changed battery voltage has attained a predetermined value (e.g., 14.5 V), the energization of the field coil 102 is intermittently controlled so as to regulate the generated voltage or the charged battery voltage to the predetermined voltage. Numeral 30 designates a generator operation indicating circuit responsive to the voltage applied to its terminal IG through the key switch 50 and the voltage at its terminal N adapted to receive the neutral point voltage of the generator 10 to control the output at its terminal L. Numeral 40 designates a lamp constituting generator operation indicating means, 60 a vehicle battery, and 70 an electric load such as a relay for controlling the operation of the other equipment installed in the vehicle whereby particularly when the output at the terminal L goes to a high potential, the relay is operated and a signal is generated which indicates that the generator 10 is generating power.

Figure 2:
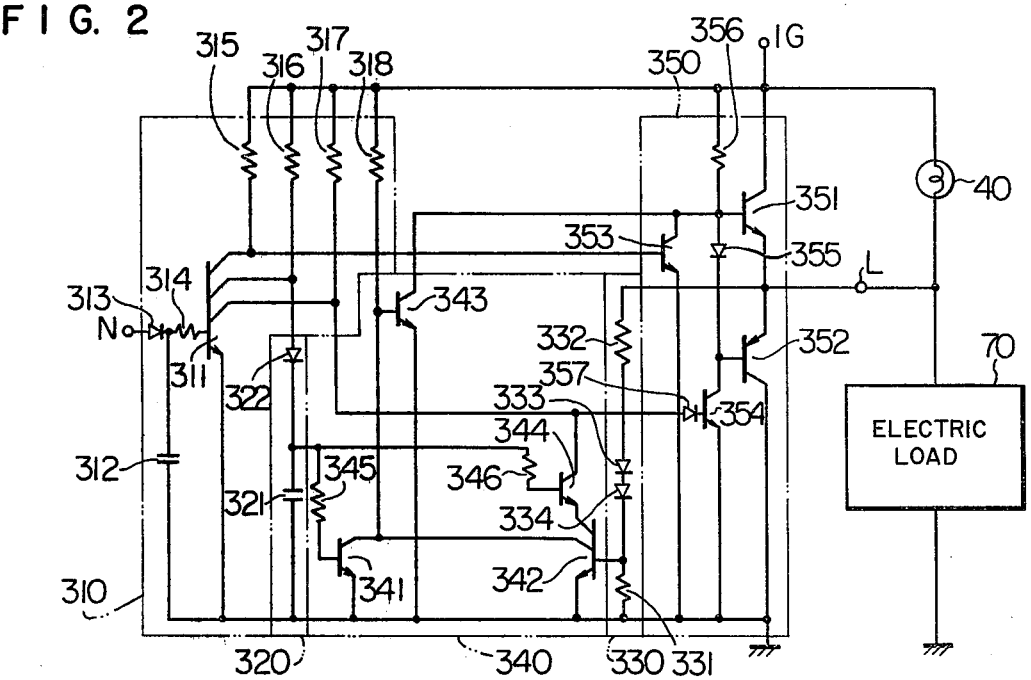
FIG. 2 is a circuit diagram showing a specific embodiment of the principal part of the embodiment shown in FIG. 1.
Figure 3:
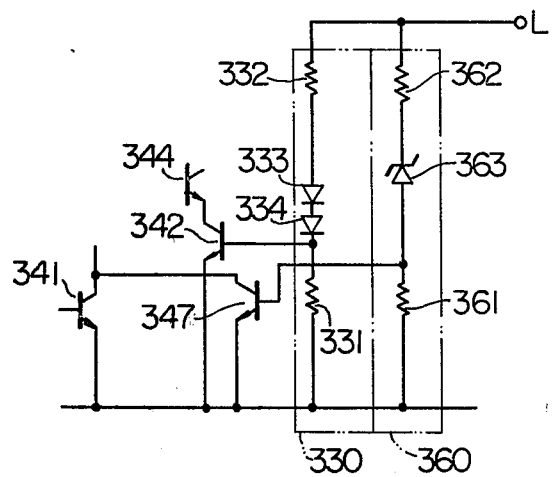
FIG. 3 is a circuit diagram showing another embodiment of the invention.

Next, the construction of the generator operation indicating circuit 30 will be described in detail with reference to FIG. 2. In the Figure, numeral 310 designates a generator operation detecting circuit comprising a multicollector transistor 311, a smoothing capacitor 312, a diode 313, a resistor 314 and input resistors 315 to 318, whereby the neutral point voltage of the generator 10 is received and the transistor 311 is turned on when the neutral point voltage reaches a predetermined value. Numeral 320 designates a delay circuit comprising a capacitor 321 and a diode 322 to transmit the generator operation to the following section with a certain delay. Numeral 330 designates a voltage detecting circuit comprising voltage dividing resistors 331 and 332 and diodes 333 and 334 to detect the voltage at the terminal L. Numeral 340 designates a control logic circuit comprising transistors 341, 343 and 344, a multicollector transistor 342 and resistors 345 and 346 whereby in response to the outputs of the delay circuit 320 and the voltage detecting circuit 330 the operation of a drive circuit which will be described later is controlled, and particularly the circuit serves a generator operation indication control function as well as a circuit protecting function in the event that an abnormal voltage is applied to the terminal L. Numeral 350 designates a drive circuit comprising a transistor 351 for driving the electric load 70, a transistor 352 for driving the indicator lamp 40, operation controlling transistors 353 and 354, diodes 355 and 357 and an input resistor 356 whereby the connections of the output at the terminal L is controlled in response to the generator operating conditions to drive either the indicator lamp 40 or the electric load 70.

With the construction described above, the operation of the generator operation indicating circuit will now be described. The key switch 50 is closed first so that during the time that the terminal IG is connected to the power source but the generator is not generating any power as yet, the transistor 311 of the generator operation detecting circuit 310 is off and in this case the drive circuit 350 is so designed that the transistor 354 is turned on, the transistor 351 is turned off and the transistor 352 is turned on. Consequently, the terminal L goes to a low potential thus drawing current, so that the lamp 40 is turned on and the electric load 70 is rendered inoperative. After a short period of time, the terminal voltage of the capacitor 321 in the delay circuit 320 increases and the transistor 344 of the control logic circuit 340 tends to be turned on. In this case, however, the potential at the terminal L has already gone to the low level so that the transistor 342 is off and consequently the transistor 344 is not turned on to turn on the transistor 354 of the drive circuit 350, thus causing the lamp 40 to remain on.

In the above-described operating condition, when the supply voltage is applied by mistake to the terminal L or the lamp 40 is short-circuited thus increasing the potential at the terminal L, at the instant that the potential exceeds a preset value the transistor 342 is turned on and the transistor 344 is also turned on, with the result that the transistors 354 and 352 are immediately turned off and the flow of any excessively large short-circuit current to the transistor 352 is prevented.

Then, when the engine is started so that the generated voltage increases, the transistor 311 of the generator operation detecting circuit 310 is turned on, with the result that the transistors 353 and 354 are turned off, the transistor 351 is turned on and the transistor 352 is turned off. Consequently, the terminal L goes to a high potential thus forcing out the current, so that the lamp 40 is turned off and the electric load 70 (e.g., relay) is operated. At this time, the transistor 341 is turned off after the expiration of a time required to discharge the stored charge of the capacitor 321 in the delay circuit 320. Consequently, although the transistor 343 tends to be turned on, at this time the terminal L has already gone to the high potential thus turning the transistor 342 on and consequently the transistor 343 is not turned on, thus causing the electric load 70 to remain in operation.

Then, with the electric load 70 being operated in the above-mentioned manner, if the negative supply voltage is applied by mistake to the terminal L or the electric load 70 is short-circuited, the potential at the terminal L is decreased so that the transistor 342 is turned off, the transistor 343 is turned on and the transistor 351 is turned off, thus preventing the flow of any excessively large short-circuit current to the transistor 351.

While, in the embodiment described above, the voltage detecting circuit 330 is used and the common monitoring level is used for the potential at the terminal L during the operation of the lamp 40 and the electric load 70, respectively, it is possible to provide a second voltage detecting circuit 360 so that the first voltage detecting circuit 330 is used for abnormal high voltage monitoring purposes when the lamp is in operation and the second voltage detecting circuit 360 is used for abnormal low voltage monitoring purposes when the electric load is in operation, thereby setting each of the circuits to the optimum monitoring level corresponding to the associated abnormal condition.

Further, by providing a resistor having a small resistance value in the load driving path including the transistor 351 or 352, it is possible to improve the sensitivity to excess load current.

It will thus be seen from the foregoing that in accordance with the present invention, in the normal condition satisfactory indication of generator operation can be effected for a vehicle generator, and in the event that any abnormal voltage is applied between the indicating means and the output terminal of the indication activating drive circuit during the indication operation for some reason or other, the indication operation is forcibly stopped to prevent the circuit elements in the drive circuit from being broken.

We claim:

1. A generator operation indicating apparatus for vehicle generators comprising:
   a generator installed in a vehicle;
   a battery connected to an output terminal of said generator;
   a key switch connected to one end of said battery;
   indicating means;
   first detector means for detecting that a power generating operation of said generator has reached a predetermined condition to generate a detection signal;
   a drive circuit connected to said key switch and said first detector means to operate said indicating means for an interval of time between an instance that said key switch is closed and another instance that said detection signal is received;
   second detector means for detecting abnormal voltage and connected between an output terminal of said drive circuit and said indicating means; and
   a control circuit responsive to the application of an abnormal voltage to said second detector means to to forcibly stop the operation of said drive circuit.

2. An indicating apparatus according to claim 1, comprising first switch means responsive to the closing of said key switch so as to be turned on to drive said indicating means, and second switch means connected between said second detector means and said first switch means to turn off said first switch means in response to said abnormal voltage.

3. An indicating apparatus according to claim 2, comprising third switch means connected to a load circuit connected to the output terminal of said drive circuit to supply a current to said load circuit in response to said detection signal; and fourth switch means for controlling said third switch means in response to a second abnormal voltage applied to said second detector means after said generator has attained said predetermined power generating condition and in response to said detection signal.

4. An indicating apparatus according to claim 3, comprising fifth switch means for detecting said predetermined power generating condition to come into operation, and delay circuit connected to said first detector means to generate a delay signal, wherein said first and third switch means are connected to said fifth switch means and said fourth switch means is connected to said delay circuit and to said second detector means through said second switch means.

5. An apparatus according to claim 3, wherein said second detector means comprises a first detecting circuit for detecting a first abnormal voltage generated prior to the occurrence of said predetermined power generating condition and a second detecting circuit for detecting said second abnormal voltage, wherein said second switch means is connected to said first detecting circuit, and said fourth switch means is connected to said second detecting circuit.

* * * * *